March 21, 1933.  G. CARLSON  1,902,488
OUTLET BOX
Filed Sept. 17, 1930
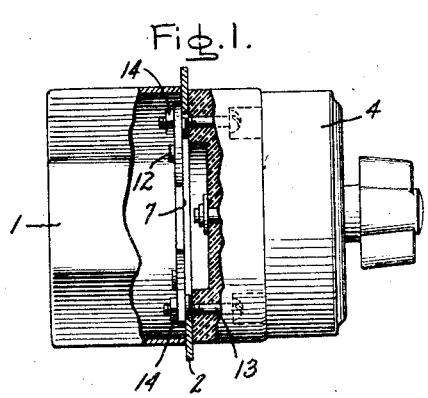
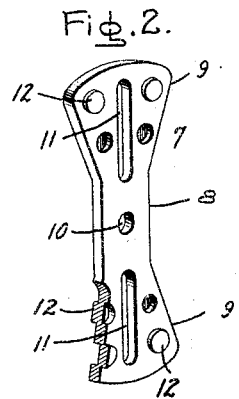
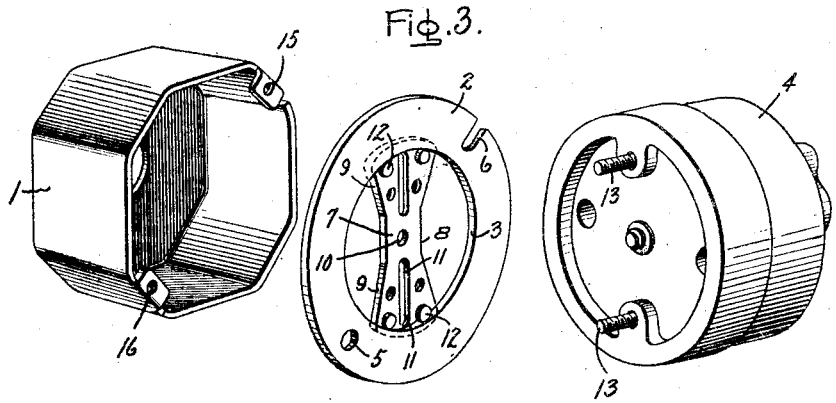
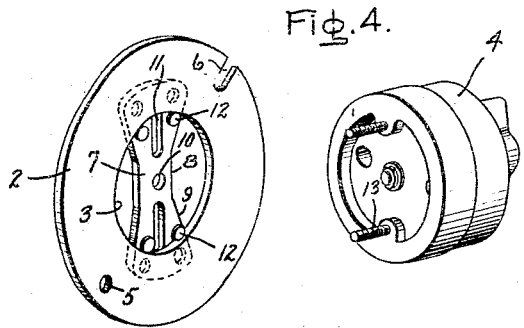
Inventor:
George Carlson.
by Charles E. Tullar
His Attorney Patented Mar. 21, 1933

1,902,488

UNITED STATES PATENT OFFICE

GEORGE CARLSON, OF BRIDGEPORT, CONNECTICUT, ASSIGNOR TO GENERAL ELECTRIC COMPANY, A CORPORATION OF NEW YORK

OUTLET BOX

Application filed September 17, 1930. Serial No. 482,549.

The invention relates to electrical outlet boxes, and more particularly to a means for mounting of switches and the like directly on the cover thereof.

The object of the invention is the provision of a simple and inexpensive adapter or bridge to be used in conjunction with a switch or similar device as a means for clamping the switch or other device to the standard house wiring outlet box cover.

For a better understanding of the invention, reference may be made to the accompanying drawing showing one embodiment thereof in which Fig. 1 is a side elevation of a switch mounted on a conduit box, parts being broken away for clearness; Fig. 2 is a perspective of the adapter with a section broken away; Fig. 3 is a perspective of the several parts shown in Fig. 1 in dissembled relation; and Fig. 4 is a perspective view similar to Fig. 3 of a smaller switch in position to be assembled with the cover plate.

In Fig. 1 of the drawing, a large sized house wiring conduit outlet box 1 provided with a cover plate 2, which has a central aperture 3, with a standard rotatory switch 4 mounted thereon.

It will be observed from Figs. 3 and 4 that the cover plates 2 are not provided with any means to which a switch or other electrical device may be attached. Each cover plate 2 is provided with the main aperture 3, through which ends of the conductor are made accessible and with a hole and notch 5 and 6 for passage of screws to secure it to the conduit outlet box 1.

According to the invention, a slotted bridge or adapter 7 having a length somewhat greater than the diameter of the aperture 3 of the cover plate 2, spans the aperture and affords a simple and inexpensive means for securing a switch or other device in place on the outer face of the cover plate 2.

The adapter or bridge 7 (Fig. 2) consists of a central or waist section 8 and two oppositely extending and enlarged end portions 9 having diverging sides and arcuate outer ends.

The waist section 8 is provided with a central aperture 10 through which a bolt or the like may extend when fastening a device thereto which is adapted to be secured by a central bolt.

Each of the enlarged end portions of the bridge is provided with a radial elongated slot 11 of such cross section and so positioned that the shanks of securing bolts, of the switches and similar devices as shown in Figs. 3 and 4, may extend through and be clamped or locked in place by screwing nuts up against the rear face of the bridge. The ends 9 are also provided with pairs of spaced and oppositely projecting lugs or wart-like projections 12 for holding the bridge centrally positioned when in place against the outlet box cover 2. Standard box covers 2 are made with apertures 3 therethrough of two sizes, the lugs are so disposed that those on one side of the bridge abut against the periphery of the larger sized aperture 3 of the cover 2 or as shown in Fig. 3 while those on the other side are so positioned as to abut against the periphery of the smaller aperture 3 or as shown in Fig. 4.

A bridge of the type described may be stamped from a plate of sheet iron and completely formed with one stroke of the punch, thus cutting the cost of manufacture to a minimum.

The use of the bridge 7 in mounting a switch similar to that shown consists in first properly arranging the bridge 7 in place against the under side of the cover plate 2, as shown in Figs. 3 or 4, so that the proper sets of lugs 12 project into the aperture 3 and abut against the periphery thereof, and switch 4 is then arranged in position so that the protruding shanks of the bolts 13 extend through the elongated slots 11, and the nuts 14 screwed home, thereby clamping together the switch, the bridge and the cover plate as in Fig. 1. After the wires have been connected to the switch the combination is securely fastened in place on the conduit outlet box by screws inserted through the apertures 5 and 6 of the cover plate and screwed into the threaded holes 15 and 16 of the outlet box.

What I claim as new and desire to secure by Letters Patent of the United States is:

1. A bridge for securing devices in place over apertures of different sizes in cover plates and which permit securing means to extend therethrough, said bridge comprising an elongated plate having elongated slots in each end thereof, and pairs of integral projecting lugs unequally spaced on opposite sides thereof and the lugs on each side adapted to abut against the periphery of a correspondingly sized aperture to position said bridge concentrically of said cover.

2. In combination, a conduit outlet box, a cover plate therefor having an aperture of any of the standard sizes therethrough, an electrical device abutting against said cover plate, a bridge the ends of which abut against the side of said cover opposite to said device, said bridge being provided with elongated slots and pairs of lugs disposed at different radial distances on opposite sides thereof and adapted to abut the periphery of the correspondingly sized cover aperture and holding means passing through said cover aperture and clamping said electrical device and bridge to opposite sides of said cover.

In witness whereof I have hereunto set my hand this 13th day of September, 1930.

GEORGE CARLSON.